Dec. 8, 1970    J. A. CHALOM    3,545,886
EJECTOR
Filed June 13, 1968
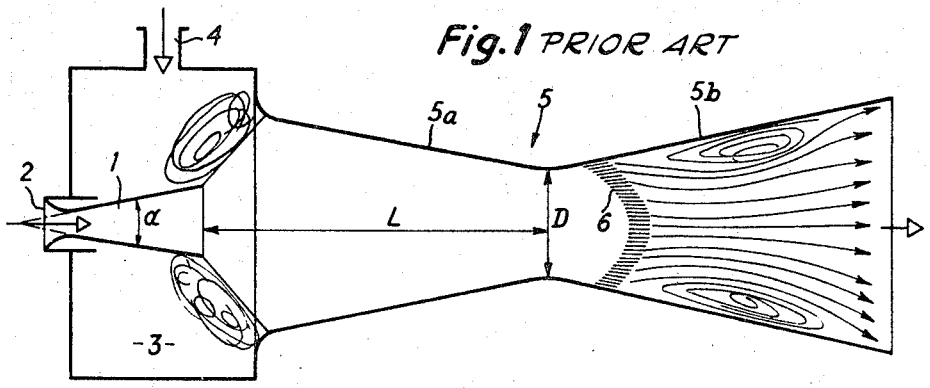
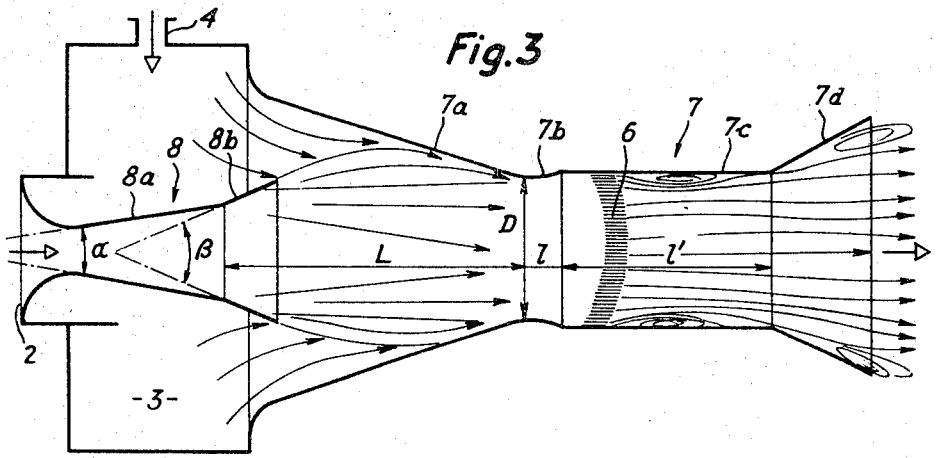
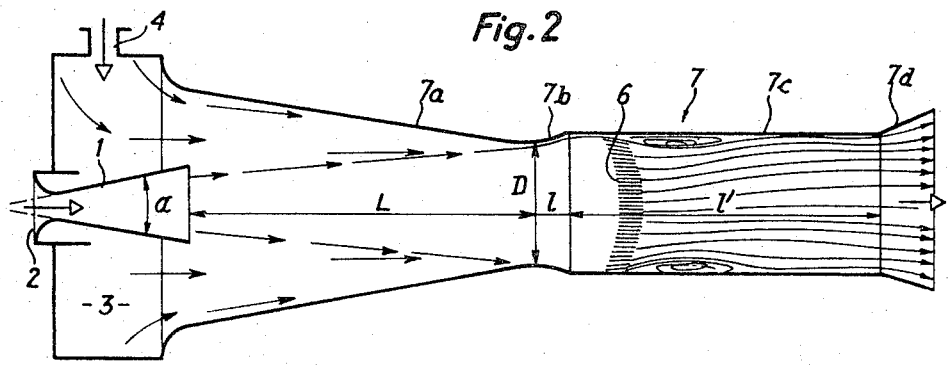

though the value $m_2$ becomes very small or even

United States Patent Office 3,545,886
Patented Dec. 8, 1970

3,545,886
EJECTOR
Joseph Aron Chalom, Suresnes, France, assignor to Condenseurs Delas, Paris, France, a French company
Filed June 13, 1968, Ser. No. 736,851
Int. Cl. F04f *5/00, 5/16, 5/48*
U.S. Cl. 417—196
4 Claims

ABSTRACT OF THE DISCLOSURE

An ejector which includes means for directing a high velocity gas stream into a convergent-divergent diffusor, within which the gas stream is compressed, the divergent portion of the diffusor including a first section which is divergent, a second section which is substantially cylindrical and within which a shock wave is created and a third section which is divergent.

FIELD OF THE INVENTION

The invention relates to an ejector which includes means for directing a high velocity gas stream across an aspiration chamber into a convergent-divergent diffusor.

DESCRIPTION OF THE PRIOR ART

In a prior form of such a device, compression of the gas stream is effected within the diffusor and a shock wave is created in the divergent portion of the diffusor and the high velocity gas stream carries with it entrained gas from the aspiration chamber whereby the pressure within the chamber is reduced. The aspiration chamber is connected to a vessel the pressure of which is to be reduced.

The divergent portion of the diffusor of such prior ejector has been of frusto-conical form and the cross-sectional area of the outlet end of the expansion tube through which the high velocity gas stream is introduced into the aspiration chamber has consequentially had to be no more than half the minimum cross-sectional area of the diffusor to ensure that the shock wave is maintained within the divergent portion of the diffusor.

Such an ejector has been found to be unstable when the pressure within the aspiration chamber has varied considerably, for example, for de-gasing molten metals it is required that the device be capable of operating satisfactorily for aspiration pressures varying periodically from 0.01 to 100 torr.

SUMMARY OF THE INVENTION

The divergent portion of the ejector includes three coaxial sections, the first and third of which are divergent and the second of which is substantially cylindrical and has a substantially greater axial length than the first section. The shock wave is created in the second section and is held therein by the divergent first section.

BRIEF DESCRIPTION OF THE DRAWING

FIG. 1 is a diagrammatic view in longitudinal axial section of a known form of aspirator used for creating a low pressure in an enclosed space;

FIG. 2 is a diagrammatic view, also in longitudinal axial section, of a first embodiment of the invention and, FIG. 3 is a diagrammatic view, again in longitudinal axial section, of a second embodiment of the invention.

DESCRIPTION OF THE PREFERRED EMBODIMENTS

FIG. 1 illustrates a known form of ejector for creating a low pressure within an enclosed space. The ejector includes a convergent-divergent expansion or delivery tube 1 having an angle of divergence α of the order of 7° and the tube 1 is supplied at 2 with steam under pressure from an appropriate source (not shown). The tube 1 opens into an aspiration chamber 3 which is connected by a conduit 4 with the enclosed space (not shown) wherein the low pressure is to be created, and there is a diffusor 5 of convergent-divergent conformation which is arranged coaxially with the tube 1 so that a gas stream delivered into its inlet end is compressed.

Between the source of team under pressure and the aspiration chamber 3 there is a pressure differential of such order as to produce, at the downstream or outlet end of the tube 1, a high speed steam jet (currently speeds of up to 1,000 metres per second are being obtained). The mass of steam issuing from said tube per unit time can be considered as $m_1$ and the steam jet frictionally carries with it ambient fluid from the chamber 3, the mass of ambient fluid removed from said chamber per unit time being considered as $m_2$.

The gas stream with the entrained fluid is partly compressed in the converging portion 5a of the diffusor 5 and is compressed further in the diverging portion 5b of said diffusor. The gas stream passes through the neck or smallest cross-sectional portion of the diffusor at a sonic speed and at a pressure which is approximately half the delivery pressure at the outlet of the diffusor. During operation of the ejector a shock wave is created at 6 in the diverging portion 5b of the diffusor.

Experience has shown that there are two dimensional requirements which must be satisfied with such an ejector and the first of these is that the ratio of the cross-sectional area of the outlet end of the tube 1 to the minimum cross-sectional area of the diffusor 5, must be less than or equal to 0.5. The second of these is that the ratio L to D, wherein L is the distance from the outlet end of the tube 1 to the neck of the diffusor and D is the diameter of the neck of the diffusor, must be less than or equal to 7. The two requirements are related and, for a given value of D, the greater the cross-sectional area of the outlet end of the tube 1 the less the value of L.

Such an ejector has average stability and has a tendency to fail when the value $m_2$ becomes very small or even zero and it has been found that the faults inherent in conventional supersonic aspirators are due to the use of a diffusor of simple convergent, divergent conformation with a uniform angle of divergence. It has also been found that in the case of a supersonic aspirator operating at a compression rate in excess of 6, the efficiency of the ejector is significantly affected by a rapid drop in pressure within the aspiration chamber 3. Such reduction in efficiency is caused by a rapid expansion of the steam jet at the outlet of the tube 1 thereby generating turbulence within the aspiration chamber 3 which interferes with and reduces the efficiency of the jet. Such reduction is all the more noticeable as a result of the cross-sectional area of the outlet end of the tube 1 being small in realtion to the minimum cross-sectional area of the diffusor 5. In order to eliminate such turbulent conditions it would be necessary, in theory, to have a tube 1 whose outlet end has dimensions substantially equal to those of the neck of the diffusor 5. However, this arrangement cannot be used since, as has been pointed out above, it is required that the cross-sectional area of the end of the tube 1 must be at most equal to half the minimum cross-sectional area of the diffusor 5.

FIG. 2 shows a first embodiment of the present invention suitable for operating at compression rates between 2 and 6, the compression rate being the degree of compression obtained within the diffusor. The ejector of FIG. 2 includes a conventional expansion tube 1 as described above and a diffusor 7 having four successive sections, namely a first section 7a of conventional convergent conformation, a second divergent section 7b of conventional divergence, i.e. of the order of 15°, the axial length of which is approximately 0.2 to 0.3 times the diameter D of the diffusor neck, a third cylindrical section 7c the length of which is approximately 8 to 10 times the diameter D of the diffusor nect (it should be noted that in the drawing the section 7c has been shown in FIGS. 2 and 3 considerably shorter than it actually is), and a fourth divergent section 7d of conventional divergent angle, of the order of 20°. The divergent section 7b which is very short is designed to provide a boundary for the shock wave 6 and to prevent it from passing into the convergent section 7a of the diffusor which would interrupt operation of the ejector. The cylindrical section 7c which follows the section 7b allows the optimum use to be made of the shock wave 6 for the further compression of the gas stream. The conventional divergent section 7d allows recuperation of the residual kinetic energy in the gas stream.

The section 7c may be of low divergence, e.g. a divergence angle of the order of 1°, instead of being cylindrical as illustrated. It is always an advantage, however, to use the smallest possible angle of divergence in order to ensure that the ratio $m_2$ plus $m_1$ to $m_1$ should be as large as possible so as to obtain the widest possible operation range for the ejector. The choice of the cylindrical conformation of the section 7c is of advantage in the production of the ejector since in this way it is possible to make the section 7c from commercially available tubular material.

FIG. 3 shows a second embodiment of the present invention which is suitable for operating at compression rates higher than 6. The ejector of FIG. 3 comprises in addition to the diffusor 7 described with reference to FIG. 2, an expansion tube 8 which includes two divergent sections of relatively increasing divergency, namely a first section 8a having an angle of divergence α less than 10°, for example of the order of 7°, and a second section 8b having an angle of divergence β of the order of 40°. The cross-sectional area of the end of the tube section 8a is of the order of half the minimum cross-sectional area of the diffustor 7 in order to allow starting of the ejector and the cross-sectional area of the end of the tube section 8b is approximately equal to said minimum cross-sectional area to afford the best possible output. The distance L between the outlet end of the tube section 8a and the neck of the diffusor must be less than or equal to 7 as in conventional ejectors as shown in FIG. 1.

The use of the doubly divergent expansion tube 8 permits an increase in the output of the ejectors, particularly when the pressure within the aspiration chamber 3 is low, for example, in the final phase of an evacuation process. The expansion tube 8 functions as follows:

At the beginning of an evacuation process the pressure in the aspiration chamber 3 is comparatively high, for example, atmospheric pressure. Since the first tube section 8a has a small angle of divergence, for example 7°, the steam jet which passes therethrough has substantially constant velocities in a given cross-section. The static pressure is also substantially constant in a given cross-section. The steam jet leaving the tube section 8a does not follow the walls of tube section 8b because of the discontinuity of the tube wall profile and the larger angle of divergence in the tube section 8b. When the pressure within the aspiration chamber 3 falls, the jet leaving the tube section 8a will tend to follow the walls of tube section 8B and expansion of the jet within the aspiration chamber occurs progressively in a manner indicated by the arrows in FIG. 3. In this way, turbulence is reduced to a minimum and can only very slightly impair the power of the jet so that the ejector has a high output.

The form of ejector shown in FIG. 3 provides a workable and satisfactory compromise between the need to conserve the starting qualities of the jet stream and the need to have a large cross sectional area end portion of the expansion tube to reduce turbulence. The provision of the three-section divergent portion of the diffusor improves the stability of the ejector and makes it much more simple to adjust and control operations of the ejector. An appreciable reduction in the time required to establish predetermined low pressure conditions within an enclosure is thus obtained.

What is claimed is:

1. A supersonic ejector comprising an expansion tube within an aspirator chamber, a diffusor aligned with said expansion tube whereby a pressurized fluid is introduced into said expansion tube to issue herefrom as a supersonic jet which enters the diffustor, said diffusor comprising a generally convergent portion in which a shock-wave is created, said generally divergent portion comprising successively a highly divergent entrance section having an axial length approximately 0.2 to 0.3 times the diameter of the minimum diameter section of the diffusor, said entrance section preventing back shifting of said shock-wave out of said generally divergent portion, a substantially cylindrical middle section having an axial length of 8 to 10 times the diameter of the minimum diameter section of the diffusor, and a high divergency outlet section.

2. An ejector as claimed in claim 1 wherein the expansion tube includes two sections of realtively increasing divergence angle, the first section having a divergent angle less than 10° and the second section having a divergent angle between 20° and 60°.

3. An ejector as calimed in claim 2 in which the cross-sectional area of the end of the firt section of the expansion tube it not greater than half the minimum cross-sectional area of the diffusor and in which the cross-sectional area of the end of the second section of the expansion tube is greater than half the minimum cross sectional area of the diffusor.

4. An ejector as claimed in claim 3 in which the cross-sectional area of the end of the second section of the expansion tube is approximately equal to the minimum cross-sectional area of the diffusor.

References Cited

UNITED STATES PATENTS

| | | | |
|---|---|---|---|
| 847,010 | 3/1907 | Koerting | 230—92X |
| 862,005 | 7/1907 | McDermott | 230—92 |
| 1,473,037 | 11/1923 | Greig | 230—92 |
| 1,748,488 | 2/1930 | McCabe | 230—92 |
| 1,942,048 | 1/1934 | Clark | 230—95 |
| 1,973,714 | 9/1934 | Justheim | 230—92 |
| 2,988,139 | 6/1961 | Coanda | 230—95X |
| 3,165,390 | 1/1965 | Parker et al. | 230—92X |
| 3,187,682 | 6/1965 | Bradshaw | 230—95X |
| 3,371,618 | 3/1968 | Chambers | 230—92X |

WILLIAM L. FREEH, Primary Examiner

W. J. KRAUSS, Assistant Examiner

U.S. Cl. X.R.

103—258; 230—95